US007276266B1

(12) United States Patent
Khare et al.

(10) Patent No.: US 7,276,266 B1
(45) Date of Patent: *Oct. 2, 2007

(54) FUNCTIONALIZATION OF CARBON NANOTUBES

(75) Inventors: Bishun N. Khare, Fremont, CA (US); Meyya Meyyappan, San Jose, CA (US)

(73) Assignee: United States of America as represented by the Administrator of the National Aeronautics and Space Administration (NASA), Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/320,698

(22) Filed: Dec. 13, 2002

(51) Int. Cl.
*H05H 1/24* (2006.01)

(52) U.S. Cl. .................. 427/533; 427/535; 427/538; 427/562; 427/569; 427/575; 427/576; 427/585; 427/294; 427/903

(58) Field of Classification Search ............. 427/533, 427/535, 538, 562, 569, 575, 576, 585, 255.24, 427/255.26, 294, 903; 118/723 ME, 723 MR, 118/723 ER, 723 IR; 423/447.1, 447.2, 423/447.3, 445 R, 445 B, 460; 977/745, 977/746, 748, 749, 847
See application file for complete search history.

(56) References Cited

U.S. PATENT DOCUMENTS

| | | | | |
|---|---|---|---|---|
| 3,870,610 A | * | 3/1975 | Baird et al. .................. 204/165 |
| 5,346,683 A | | 9/1994 | Green et al. ............. 423/447.2 |
| 5,698,175 A | | 12/1997 | Hiura et al. ............. 423/447.1 |
| 6,033,582 A | * | 3/2000 | Lee et al. .................. 216/37 |
| 6,167,835 B1 | * | 1/2001 | Ootera et al. ............ 118/723 E |
| 6,263,830 B1 | * | 7/2001 | Kamarehi et al. .. 118/723 MW |
| 6,346,303 B1 | * | 2/2002 | Shih et al. .................. 427/571 |
| 6,417,111 B2 | * | 7/2002 | Nishikawa et al. ......... 438/710 |
| 6,444,864 B1 | | 9/2002 | Knight et al. ............... 585/241 |
| 6,479,028 B1 | | 11/2002 | Kaner et al. ................. 423/414 |
| 2002/0197474 A1 | * | 12/2002 | Reynolds ................... 428/398 |
| 2003/0048056 A1 | * | 3/2003 | Kitamura et al. ........... 313/311 |
| 2005/0008561 A1 | * | 1/2005 | Fischer et al. ........... 423/447.1 |

OTHER PUBLICATIONS

E. T. Mickelson et. al, "Florination of Single-Wall Carbon Nanotubes," Chem. Phys. Lett. vol. 296, pp. 188-194 (1998).
J. Chen et. al, "Solution Properties of Single-Walled Carbon Nanotubes," Science, vol. 282, pp. 95-98 (1998).

* cited by examiner

*Primary Examiner*—Bret Chen
(74) *Attorney, Agent, or Firm*—John F. Schipper; Robert M. Padilla

(57) ABSTRACT

Method and system for functionalizing a collection of carbon nanotubes (CNTs). A selected precursor gas (e.g., $H_2$ or $F_2$ or $C_nH_m$) is irradiated to provide a cold plasma of selected target particles, such as atomic H or F, in a first chamber. The target particles are directed toward an array of CNTs located in a second chamber while suppressing transport of ultraviolet radiation to the second chamber. A CNT array is functionalized with the target particles, at or below room temperature, to a point of saturation, in an exposure time interval no longer than about 30 sec.

8 Claims, 4 Drawing Sheets

FUNCTIONALIZATION OF CARBON NANOTUBES

FIELD OF THE INVENTION

This invention is related to addition of functional groups to collections of carbon nanotubes.

BACKGROUND OF THE INVENTION

Carbon nanotubes (CNTs) have attracted much attention, due to their extraordinary mechanical properties and their unique electronic properties. A CNT is topologically equivalent to a two-dimensional graphite sheet rolled into a cylinder, with a cylinder diameter as small as 0.7 nanometers (nm) and with a cylinder length up to several microns ($\mu$m). A CNT can be single walled (SW) or multiple walled (MW) and can also be fabricated as a nanofiber or other CNT structure. A CNT can be characterized by its chiral vector components (n,m), which helps determine tube diameter, electronic properties and other properties. Depending upon the chirality (n-m divisible by 3 or otherwise), a CNT can be conducting (metal-like) or semi conducting.

CNTs are being studied for applications in high strength/low weight composites, membranes, mechanical filters, body armor, space suits, electronics, nano-electro-mechanical systems, heat exchange systems, radiators, chemical sensors, physical sensors, actuators, data storage, computers and other applications. In some of these applications, chemical functionalization (addition of one or more specified chemical groups to a basic structure) may be necessary to alter the CNT properties for particular applications. For example, functionalization of the CNT tip or the side walls with suitable probe molecules can provide chemical sensors that recognize certain target species and ignore all others. Development of functional composites may require functionalization of a collection of CNTs to allow the tubes to be dispersed more easily in a host matrix.

An ideal functionalization process should be clean, produce relatively little residue for disposal, should be efficient, selective, and reasonably fast, should be scalable to large scale production, should not require use of complex apparatus to produce the target species or attach the species to the CNTs, and should not require complex chemical processing.

The CNT functionalization processes reported in the literature use wet chemical procedures and work with liquids or vapors, to which the CNTs are exposed. An example is use of hot flowing fluorine to attach fluorine atoms to CNTs, as reported by E. T. Michelson et al in Chem, Phys. Lett. vol 296 (1998) 188. Large quantities of wet chemicals are often required, with most of the chemicals becoming residues that must be disposed of under hazardous substance guidelines. Recycling of the chemicals used is seldom an option.

What is needed is a CNT functionalization process that is "dry", produces relatively little residue for clean-up, is flexible enough to be used for large numbers of chemical functional groups, is reasonably selective, is scalable, and does not require use of complex apparatus or complex processing to achieve functionalization of a collection of CNTs.

SUMMARY OF THE INVENTION

These needs are met by the present invention, which provides a selective, scalable approach, not involving "wet" chemistry, for functionalization of a collection of CNTs with any of a large class of elements and compounds, including hydrogen, the alkali metals, selected hydrocarbons, selected organic species, and the halogens. Taking hydrogen as an example of a target species, atomic hydrogen is produced by applying a glow discharge to a molecular hydrogen source to provide a cold plasma, and using a strong pressure differential to direct the atomic hydrogen thus produced toward the CNTs. Atomic hydrogen that is not received by the CNTs can be allowed to recombine and can be recovered for another glow discharge cycle.

DESCRIPTION OF PREFERRED MODES OF THE INVENTION

Figure 1:
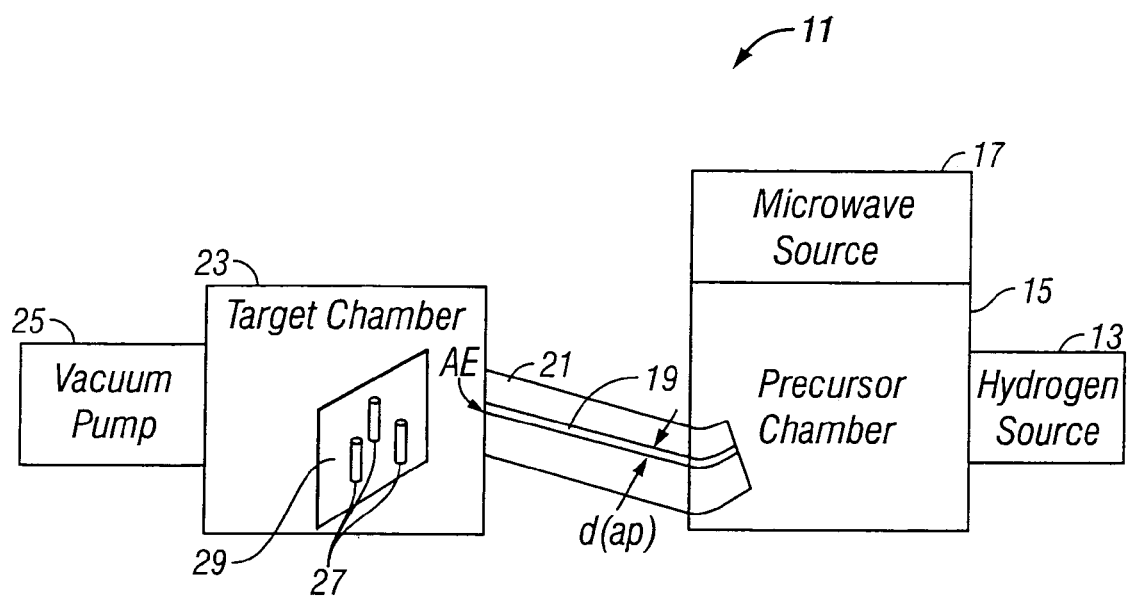
FIGS. 1, 6 and 7 illustrate systems for practicing the invention.

FIG. 1 illustrates a system 11 for practicing the invention to provide hydrogen as the species for functionalization of the CNTs. The system 11 includes a precursor source 13 that feeds hydrogen (e.g., molecular hydrogen, with a purity of 99.9999 percent or better) to a partially evacuated precursor chamber 15. Molecular hydrogen in the precursor chamber 15 is irradiated by a microwave source or other suitable radiation source 17, for example, a McCarroll cavity operating at 2.45 GHz and powered by an Opthos microwave generator. The radiation source 17 provides sufficient radiant energy to produce a cold plasma, in which the free electrons, with typical temperatures $T_e \approx$ a few electron volts (1 eV corresponds to T=11,604 K), are much hotter than the resulting partially ionized gas, which has typical temperatures $T_g \approx$ 350-1000 K. This discharge produces electrons by ionization and radicals, especially atomic hydrogen as a precursor particle, by dissociation.

Part of the atomic hydrogen thus produced is received in an aperture 19 in a plug 21 of TEFLON or other suitable material having an outer diameter of 5-25 mm, where the aperture 19 has a selected diameter (e.g., d(ap)≈1 mm), has a selected length (e.g., 5-25 mm, or greater if desired), and connects the precursor chamber 15 with a target chamber 23 that contains a collection of CNTs 27, assembled in an array on a substrate 29, such as $CaF_2$. The substrate 29 is located adjacent to an aperture exit AE of the aperture 19, is oriented substantially perpendicular to the particle flow direction within the aperture at the aperture exit, and coated with purified CNTs. At appropriate time intervals, the substrate 29 can be removed from the target chamber 23 to harvest the functionalized CNTs and can be replaced by another substrate including non-functionalized CNTs. Purity of the CNTs used here is monitored using transmission electron microscopy, which verifies that troublesome substances, such as Fe nano-particle, are removed by the purification process (described in Khare et al, Nano Lett. vol. 2 (2002) pp. 73-77, incorporated by reference herein).

The precursor chamber 15 and the target chamber 23 are maintained at pressures of 100-1000 $\mu$m Hg and 1-10 $\mu$m Hg (optionally including an inert carrier gas, such as including $N_2$, Ne or Ar), respectively, using a vacuum pump 25 for the chamber 23, so that a large pressure ratio (100:1 to 500:1) exists between the two chambers. This large pressure ratio will encourage most of the atomic hydrogen produced in the precursor chamber 15 to move relatively quickly into and along the aperture 19 and to collide, react with and functionalize the CNTs 27. This functionalization process has been performed at room temperature and at temperatures down to liquid nitrogen temperatures.

Figure 2:
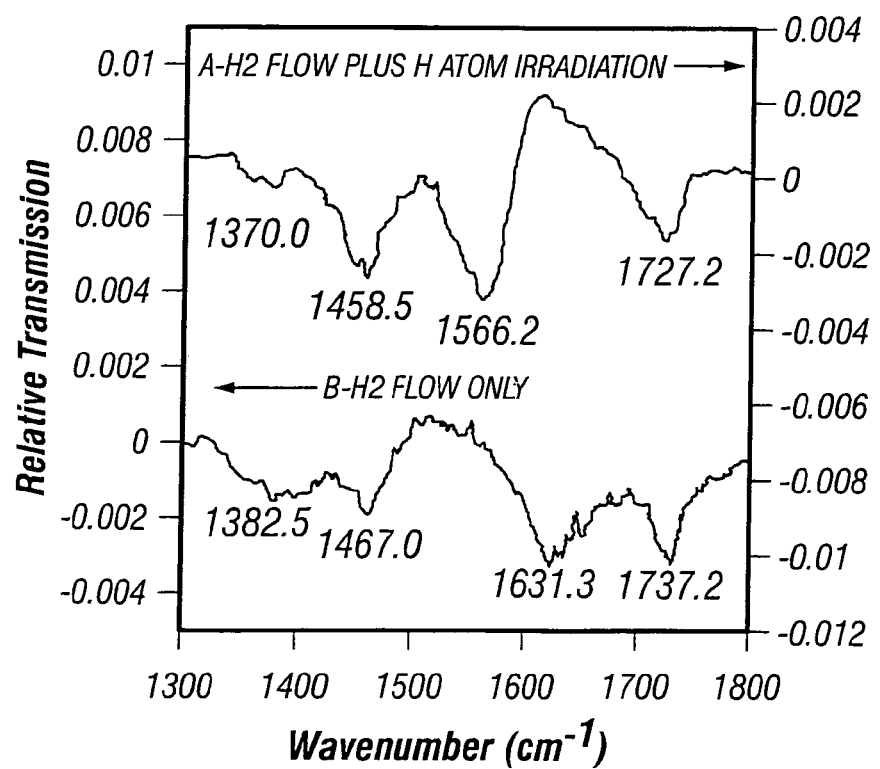
FIG. 2 graphically illustrates FTIR spectra of non-functionalized CNTs and CNTs functionalized according to the invention.

FIG. 2 shows FTIR spectra for wavenumbers $v'=1300$-$1800$ cm$^{-1}$, illustrating relative transmission for a CNT array (i) exposed to $H_2$ plus atomic H produced by a glow discharge and (ii) exposed to only $H_2$ (no discharge). C—H bending modes at wavenumbers of about $v'=1370$ cm$^{-1}$ and $v'=1459$ cm$^{-1}$ are manifest in the glow discharge curve, as expected from other experimental data. Two other spectral features occur at $v'=1566$ cm$^{-1}$ and $v'=1727$ cm$^{-1}$, which may correspond to C—C interaction in unfunctionalized CNTs and to C=C or C=O interaction in any carbonyl groups that are present. CNTs are known to absorb O atoms and $CH_m$ molecules easily, even at very low pressures, and O atoms and/or $CH_m$ molecules may be present as trace impurities in the hydrogen. The intensities of the extrema in the discharge curve did not change for exposure time intervals of between one and seven hours.

Figure 3:
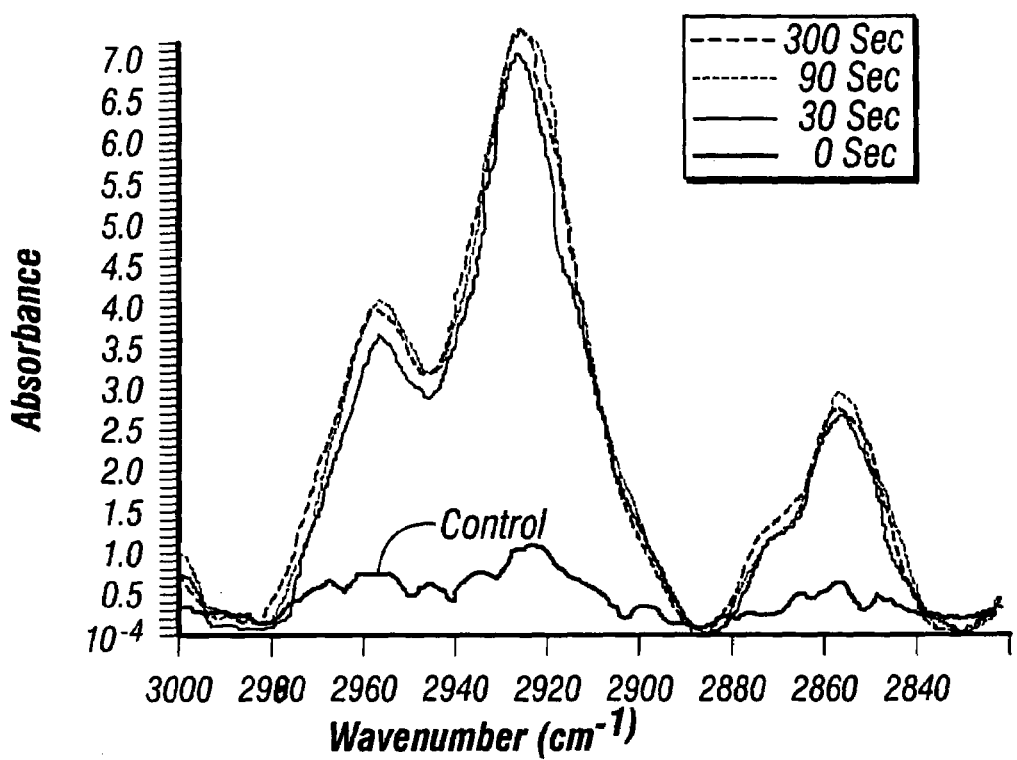
FIG. 3 graphically illustrates saturation of CNT functionalization, using hydrogen, at various times.

This approach provides substantially complete hydrogen functionalization of an assembly of CNTs, in a time interval as small as 30 sec. This is shown in FIG. 3, which is a graph illustrating variation of optical absorbance in CNT samples exposed to atomic hydrogen for a selected infrared region ($v'=2820$-$3000$ cm$^{-1}$) of the spectrum corresponding to C—H stretching bonds in $CH_m$ (m=2, 3). The CNT samples were exposed for time intervals of 0 sec (control specimen), 30 sec, 90 sec and 300 sec. The absorption values for 30, 90 and 300 sec are substantially the same and are a factor of about 6 higher than the corresponding values for the control specimen, indicating that the hydrogen functionalization of CNTs saturates in an exposure time interval no greater than 30 sec. The absorption differences between the exposure time intervals $\Delta t=30$, 90 and 300 sec in FIG. 3 are very small, but each of these absorption levels is much greater than the corresponding absorption value for the control sample level. Further experiments indicate that the hydrogen functionalization of CNTs saturates in a time interval that may be less than 30 sec. Chemisorption of atomic hydrogen onto CNT side walls is a slightly exothermic process, with an estimated energy of about 26 kcal/mole.

FIG. 3 graphically illustrates the FTIR spectra obtained for a control sample (0 sec) and samples exposed for time intervals $\Delta t=30$, 90 and 300 sec. The band at $v'=2924$ cm$^{-1}$ (corresponding to a wavelength $\lambda=3.4$ μm) arises from C—H stretching bonds and is in reasonable agreement with a computer-modeled value of about $v'=2900$ cm$^{-1}$. The unmodified SWCNTs do not have any infrared (IR) modes near $v'=2900$ cm$^{-1}$, although a small background level of C—H stretching mode is present in the control sample, as shown. As the SWCNTs are exposed to the H atoms, hydrogen functionalization of the nanotubes rapidly saturates, as indicated in the preceding. Subsidiary features at wavenumbers $v'=2955$ cm$^{-1}$, $v'=2871$ cm$^{-1}$, $v'=2863$ cm$^{-1}$, and $v'=2854$ cm$^{-1}$ are typical of C—H stretching modes in $CH_m$ groups, which are present in small amounts in $H_2$ gas, even after liquid nitrogen trapping. Methane ($CH_4$) is known to be easily absorbed onto SWCNTs, and this may contribute to the background manifested by the control sample. Exposure of identical samples of SWCNTs to $H_2$ molecules (no discharge present, but with trace amounts of hydrocarbon impurities) under identical conditions for identical time intervals produced the same peaks, but at peak intensities several orders of magnitude smaller. Therefore, the absorption results in FIG. 3 can be attributed to functionalization of SWCNTs with atomic hydrogen, exposed to the plasma.

Experiments to demonstrate substantial functionalization of single wall CNTs (SWCNTs) with atomic hydrogen have been performed. Molecular hydrogen gas ($H_2$, 99.9999 percent purity) was passed through a liquid nitrogen trap to eliminate water and hydrocarbon impurities, with an $H_2$ pressure of about 500 μm Hg in the precursor chamber 13. The pressure in the CNT chamber 23 was about 1 μm Hg. The $H_2$ precursor gas was irradiated, and a beam of H particles was directed along a central axis CA of the aperture 19 toward an array of SWCNTs on the substrate 29 in the CNT chamber 23. The SWCNTs were produced by the HiPCO process and were purified, as described in the Khare et al article, op cit. The approach extends to other procedures, in addition to HiPCO, for producing SWCNTs and MWCNTs.

Before functionalization with H, the SWCNTs were baked in a vacuum for 30 minutes at a temperature T=810° C. to remove hydrocarbon impurities. A Thermo Nicolet Nexus 670 Fourier transform infrared (FTIR) spectrometer at 4 cm$^{-1}$ resolution and a Perkin Elmer UV-VIS-NIR spectrometer (model Lambda 900) were used to analyze control (non-functionalized) and functionalized SWCNT samples.

Recombination of atomic hydrogen to produce molecular hydrogen, as well as other reactions, will also produce ultraviolet radiation within the precursor chamber 15, and such radiation is known to break C—H bonds in hydrogenated structures such as hydrogenated CNTs. For this reason, the aperture 19 in the plug 21 is aligned with an initial and/or final aperture segment that is curvilinear (referred to herein as "off-axis alignment"), or is otherwise configured so that little or no uv radiation is received by the target chamber 23 from the precursor chamber 15.

Figure 4:
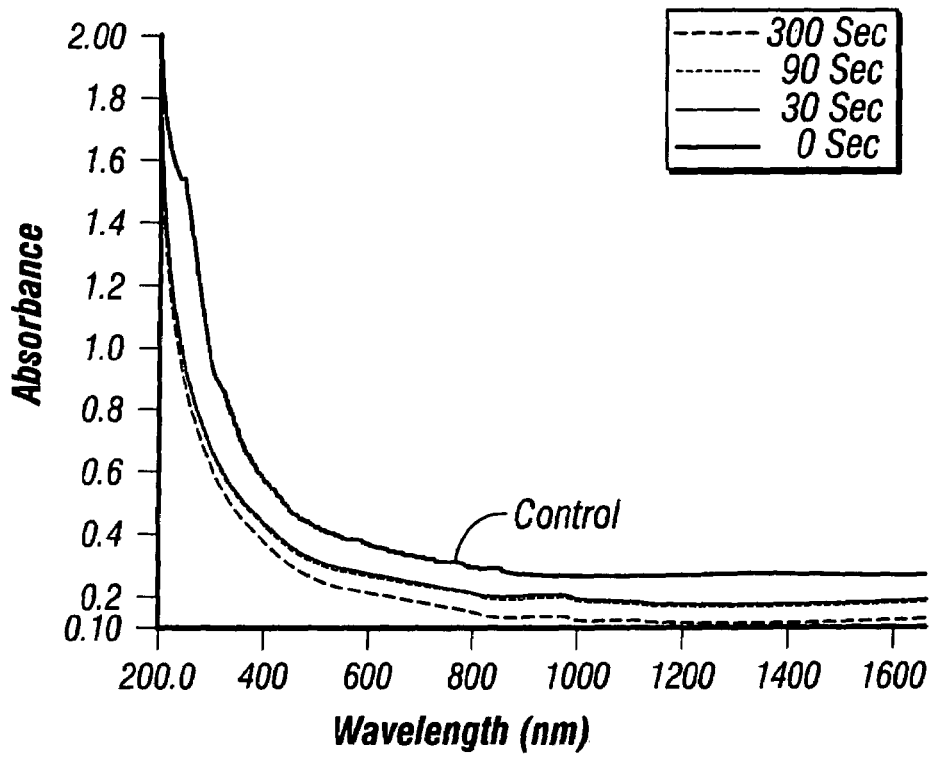
FIG. 4 graphically illustrates absorption of the samples from FIG. 2 in portions of the ultraviolet, visible and infrared spectrum.

Recent theoretical studies by Bauschlicher et al, reported in Nano Lett. vol. 1 (2001) pp. 223 and in Nano Lett. vol. 2 (2002) p. 337, indicate that the maximum hydrogen coverage on the outside of a CNT is about 50 percent, due to sp$^3$ hybridization. Ultraviolet absorption, arising from $\pi \varnothing \pi^*$ excitations in a CNT covered with H atoms, are expected to be reduced to about half the absorption values found for "bare" CNTs with no H atoms present. FIG. 4 shows UV-VIS-NIR absorption data for the same samples as shown in FIGS. 2 and 3. The spectra are featureless for CNTs having varying diameters and bandgaps. The decrease in UV absorption intensity is consistent with decrease in the fraction of C—C π bonds present, as would be expected. These UV-VIS-NIR data are consistent with the IR results of FIG. 3 and supports the hypothesis that the SWCNT data, shown in FIG. 3, indicate substantial functionalization of these CNTs with atomic hydrogen.

This approach uses a glow discharge or cold plasma irradiation of the precursor molecules (here, $H_2$) to provide functionalization of CNTs. The procedure is a clean, low temperature process that requires a relatively small amount of precursor gas (here, $H_2$) and uses relatively high efficiency plasma production. A cold plasma process can be used for production of single species atomic halogens, beginning with a precursor gas such as $F_2$, $Cl_2$, $Br_2$ or $I_2$. A cold plasma process can be used for production of single species atomic alkali metals (single valence), such as Li, Na, K, Rb and Cs. A cold plasma process can also be used for production of low atomic weight hydrocarbons, such as $C_nH_{2n}$, $C_nH_{2n+1}$, and $C_nH_{2n+2}$ (n=1, 2, 3) and for organic species such as dichlorocarbene ($H_2CCl_2$), although the species selectivity here will not be high. The precursor gas can be irradiated using dc, radiofrequency, microwave, or inductive or electron cyclotron resonance (ECR) discharges.

Multiple wall CNTs can also be functionalized using the approaches disclosed here, although it is likely that the outer or exposed layer(s) of CNTs in the initial structure will be the primary sites for such functionalization.

Figure 5:
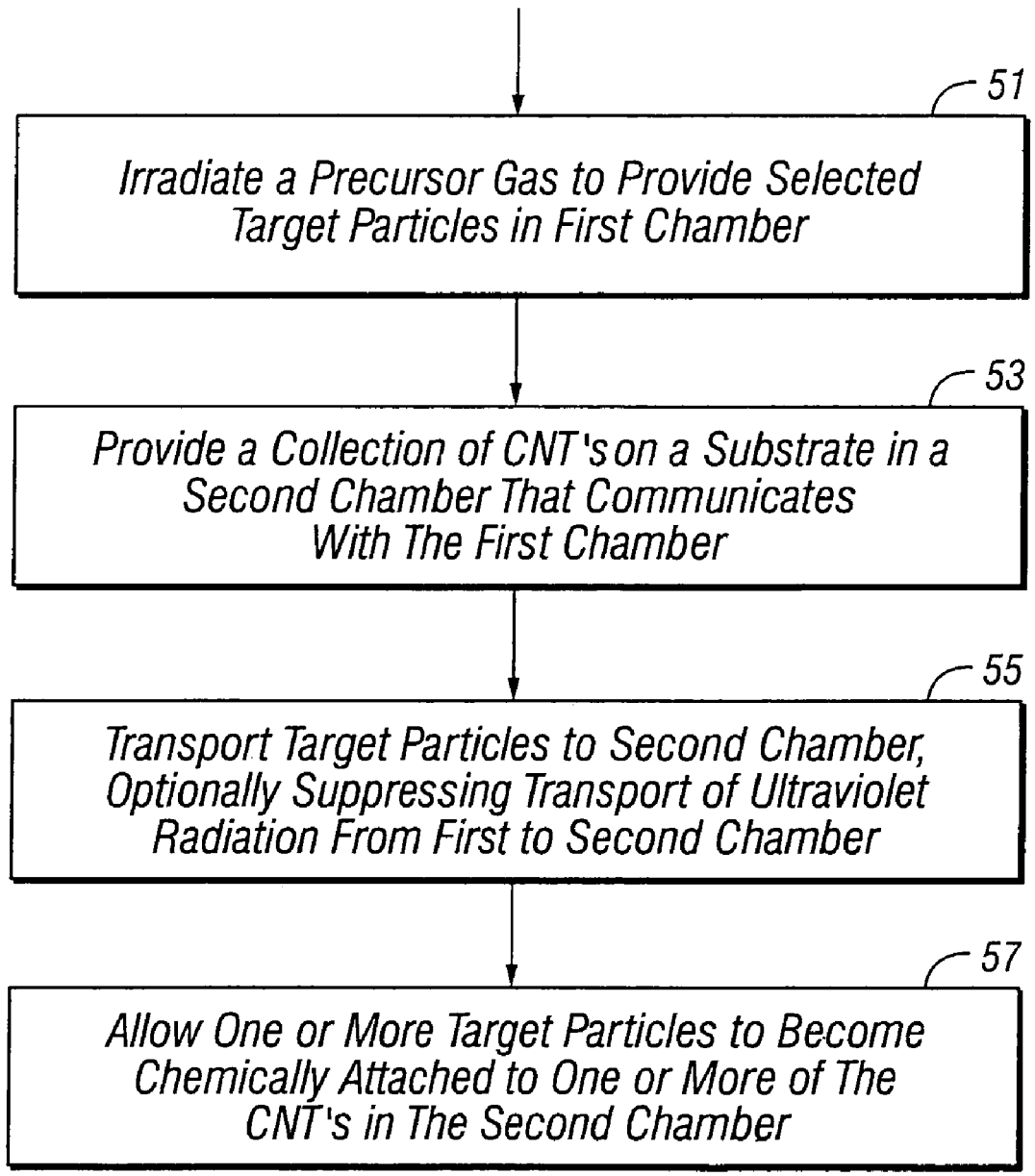
FIG. 5 is a flow chart of a procedure for practicing the invention.

FIG. 5 is a flow chart illustrating a procedure for practicing the invention. In step 51, a selected precursor gas is irradiated to provide selected target particles in a first chamber. In step 53, a collection of CNTs on a selected substrate is provided in a second chamber that is in fluid communication with the first chamber. In step 55, transport of target particles from the first chamber to the second chamber is allowed; optionally, the first chamber-to-second chamber communication mechanism is configured to suppress transport of ultraviolet radiation from the first chamber to the second chamber. In step 57, one or more of the target particles is allowed to become chemically attached to one or more CNTs within the second chamber.

Figure 6:
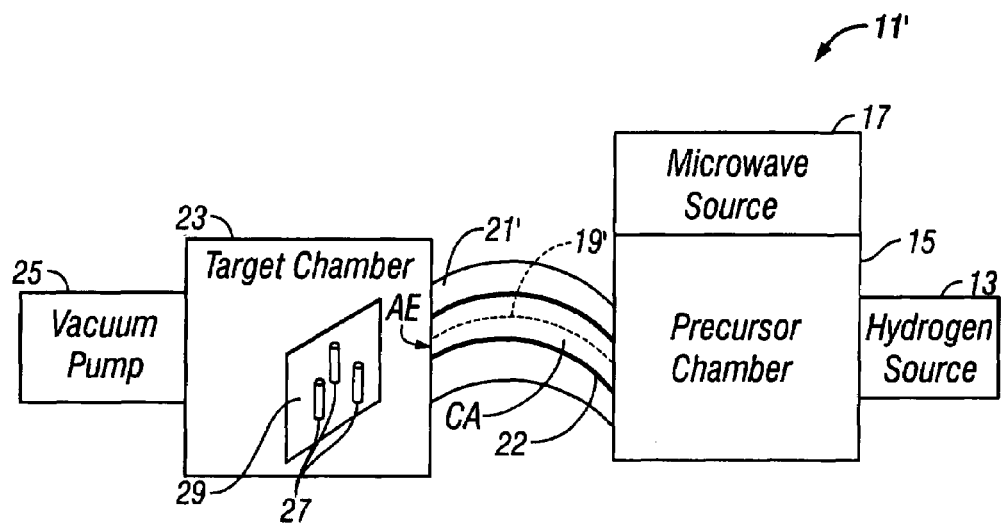

Another method of suppressing transport of uv radiation from the precursor chamber 15 to the target chamber 23 is illustrated in FIG. 6. An elongated aperture 19' in a plug 21' is provided with a curvilinear central axis CA' having substantial curvature, rather than with the linear or straight axis illustrated in FIG. 1, so that no radiation, and more particularly no uv. radiation, can travel in a single straight line in moving from the precursor chamber 15 to the target chamber 23. Optionally, where the aperture axis is linear or curvilinear, part or all of the interior or side walls of the aperture 19' are lined with a substance 22 that absorbs uv. radiation and that, in response to such absorption, either (i) does not emit radiation or (ii) emits only radiation at infrared or lower energies that do not cause C—H or C—C bond breakage in CNTs or functionalized CNTs.

Figure 7:
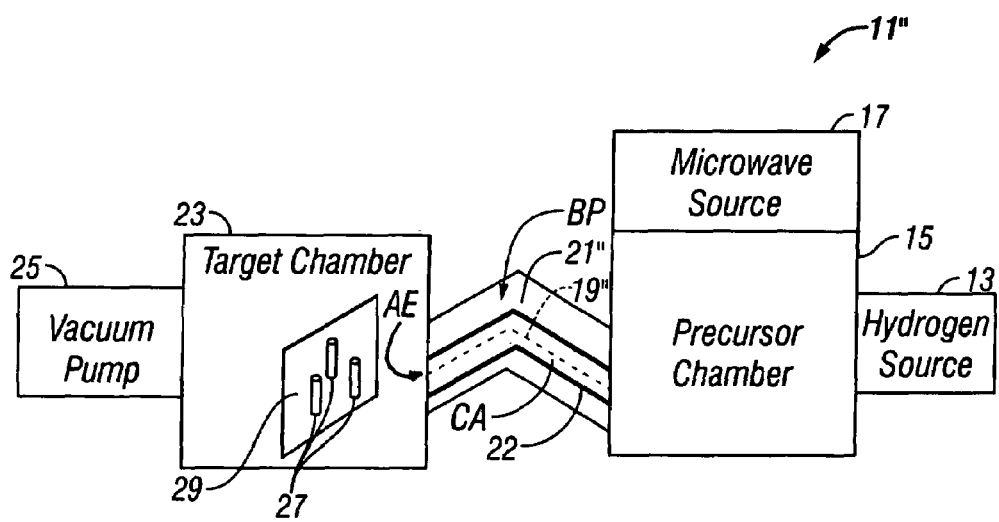

Another method of suppressing transport of uv radiation from the precursor chamber 15 to the target chamber 23 is illustrated in FIG. 7. An elongated aperture 19" in a plug 21" is provided with a central axis CA" that includes two or more linear (or curvilinear) segments that are joined together at one or more bend points BP, at each of which the directions of the two contiguous segments are substantially different. With this configuration, no radiation (ultraviolet or otherwise) can travel in a single straight line in moving from the precursor chamber 15 to the target chamber 23. Again, part or all of the interior or side walls of the aperture 19" are lined with a substance 22 that absorbs uv. radiation and that, in response to such absorption, either (i) does not emit radiation or (ii) emits only radiation at infrared or lower energies that do not cause C—H or C—C bond breakage in CNTs or functionalized CNTs.

What is claimed is:

1. A method for functionalizing a collection of carbon nanotubes (CNTs), the method comprising:

irradiating a precursor gas to provide a plurality of selected target particles in a first chamber having a first selected chamber pressure p1;

providing a collection of CNTs on a substrate in a second chamber having a second selected pressure p2, where p2 lies in a range of about between $p1/500 \leq p2 \leq p1/100$;

providing a particle communication mechanism that allows transport of at least a portion of the target particles from the first chamber to the second chamber, wherein the mechanism is configured so that transport of ultraviolet radiation from the first chamber to the second chamber is suppressed by providing an elongated aperture, having an aperture central axis and an aperture side wall and connecting the first and second chambers; wherein at least one of the following present: (i) the aperture central axis is aligned off-axis so that substantially no ultraviolet radiation that is produced within the first chamber can move in a single straight line from the first chamber to the second chamber, (ii) the aperture central axis is curvilinear, and is provided with sufficient curvature so that substantially no ultraviolet radiation that is produced within the first chamber can move in a single straight line from the first chamber to the second chamber, and (iii) the aperture central axis has at least one bend point at which a direction of the central axis changes abruptly so that substantially no ultraviolet radiation that is produced within the first chamber can move in a single straight line from the first chamber to the second chamber; and allowing at least one of the target particles to become chemically attached to at least one of the CNTs in the second chamber.

2. The method of claim 1, further comprising choosing the target particles from a group of target particle species consisting of H, Li, Na, K, Rb, Cs, F, Cl, Br, I, dichlorocarbene, $C_nH_{2n}$, $C_nH_{2n+1}$ and $C_nH_{2n+2}$, with n=1, 2 and 3.

3. The method of claim 1, wherein said step of irradiating said precursor gas comprises irradiating said precursor gas with at least one of a dc source, a radiofrequency source, a microwave source and an induction source of radiation to provide a cold plasma.

4. The method of claim 1, further comprising choosing said pressure p1 in a range $100 \ \mu m \ Hg \leq p1 \leq 1000 \ \mu m \ Hg$.

5. The method of claim 1, further comprising choosing said pressure p2 in a range $1 \ \mu m \ Hg \leq p2 \leq 10 \ \mu m \ Hg$.

6. The method of claim 1, further comprising allowing at least one of said target particles to become chemically attached to at least one of said CNTs in said second chamber in an exposure time interval no longer than about 30 sec.

7. The method of claim 1, further comprising allowing said at least one target particle to become chemically attached to said at least one CNT at a temperature in said second chamber that is no greater than about room temperature.

8. The method of claim 1, further comprising providing at least a portion of said aperture side wall with a chemical substance (i) that absorbs said ultraviolet radiation and emits no radiation in response thereto or (ii) that absorbs said ultraviolet radiation and, in response thereto, emits radiation having an emitted energy that is lower than required to cause a bond breakage in at least one of a C—C bond and a C—H bond one of said target articles in said second chamber.

* * * * *